United States Patent
Kessler

(10) Patent No.: US 12,313,207 B2
(45) Date of Patent: May 27, 2025

(54) PIPE INSPECTION DEVICE WITH VARIABLE HEIGHT CONTROL

(71) Applicant: Envirosight LLC, Randolph, NJ (US)

(72) Inventor: Peter Kessler, Hirschegg (AT)

(73) Assignee: ENVIROSIGHT LLC, Randolph, NJ (US)

( * ) Notice: Subject to any disclaimer, the term of this patent is extended or adjusted under 35 U.S.C. 154(b) by 399 days.

(21) Appl. No.: 17/678,192

(22) Filed: Feb. 23, 2022

(65) Prior Publication Data
US 2022/0178488 A1 Jun. 9, 2022

Related U.S. Application Data

(63) Continuation of application No. PCT/IB2020/000736, filed on Aug. 24, 2020.

(60) Provisional application No. 62/890,994, filed on Aug. 23, 2019.

(51) Int. Cl.
*F16L 55/34* (2006.01)
*F16L 101/30* (2006.01)

(52) U.S. Cl.
CPC .......... *F16L 55/34* (2013.01); *F16L 2101/30* (2013.01)

(58) Field of Classification Search
CPC .............................. F16L 55/34; F16L 2101/30
See application file for complete search history.

(56) References Cited

U.S. PATENT DOCUMENTS

| 3,492,477 | A | * | 1/1970 | Arnesen | G01N 23/18 |
| | | | | | 378/198 |
| 9,239,297 | B2 | * | 1/2016 | Sibai | B25J 5/007 |
| 9,657,884 | B1 | * | 5/2017 | Carte | F16L 55/44 |
| 9,869,420 | B2 | | 1/2018 | Penza | |
| 11,097,796 | B2 | * | 8/2021 | Abdellatif | B64U 10/14 |
| 11,560,977 | B2 | * | 1/2023 | Duncan | F16L 55/34 |
| 11,584,516 | B2 | * | 2/2023 | Abdellatif | B64U 60/20 |
| 11,850,726 | B2 | * | 12/2023 | Bryner | B25J 9/1617 |
| 2015/0316195 | A1 | * | 11/2015 | Penza | F16L 55/32 |
| | | | | | 405/184.1 |

FOREIGN PATENT DOCUMENTS

| CN | 1456467 | | 11/2003 |
| CN | 1456467 | A * | 11/2003 |
| CN | 205716229 | | 11/2016 |

(Continued)

OTHER PUBLICATIONS

International Preliminary Report on Patentability mailed Feb. 17, 2022 in International Application No. PCT/IB2020/000736.

(Continued)

*Primary Examiner* — Octavia Hollington
(74) *Attorney, Agent, or Firm* — FisherBroyles LLP

(57) ABSTRACT

A crawler comprising: (a) a body; (b) a camera head in or connected to said body; (c) a plurality of motorized hub assemblies; and (d) a plurality of legs, each of said plurality of legs having a first end and a distal second end, said first end being connected to said body, and said second end being connected to one of said plurality of motorized hub assemblies, wherein said legs are actuatable to define a minimum extended position and an extended position, wherein said motorized hub assemblies are close to said body in said minimum extended position, and distal from said body in said extended position.

20 Claims, 6 Drawing Sheets

(56) References Cited

FOREIGN PATENT DOCUMENTS

| CN | 205716229 | U | * | 11/2016 | | |
|----|-----------|---|---|---------|---|---|
| CN | 106224690 | A | * | 12/2016 | ............. | F16L 55/32 |
| CN | 108253227 | A | * | 7/2018 | ............. | F16L 55/32 |
| CN | 109140112 | | | 1/2019 | | |
| CN | 219527926 | U | * | 8/2023 | | |
| JP | H09254781 | | | 9/1997 | | |
| JP | H09254781 | A | * | 9/1997 | | |
| JP | 4585132 | | | 11/2010 | | |

OTHER PUBLICATIONS

International Search Report mailed Jan. 22, 2021 in International Application No. PCT/IB2020/000736.
Written Opinion of the International Searching Authority mailed Jan. 22, 2021 in International Application No. PCT/IB2020/000736.

* cited by examiner

PIPE INSPECTION DEVICE WITH VARIABLE HEIGHT CONTROL

REFERENCE TO RELATED APPLICATION

This application is based on U.S. provisional application 62/890,994, filed Aug. 23, 2019, herein incorporated by reference.

FIELD OF INVENTION

The present invention relates generally to pipe crawler for inspecting sewer and storm pipes, and, more particular, to a pipe crawler having variable height control for inspecting pipes of different diameters.

BACKGROUND

Non-invasive pipe inspection is often performed using a pipe crawler. A pipe crawler is a wheeled robot which is able to travel down a sewer or storm pipe and identify maintenance problems unobservable to humans. Commercially-available pipe crawlers tend to be submersible, autonomous or tethered, and equipped with a variety of sensors such as a camera, vapor sensors, and positioning sensors. But, to their disadvantage, most are wheeled and require wheels of different diameter to adapt to pipes of different diameter. In other words, different sized wheels are used for different sized pipes.

A conventional crawler is typically configured with a crawler body containing a motor for powering wheels. Because the wheels need to be interchangeable to accommodate different sized pipes, the motor had to be sized for the largest wheel size. Thus, the motor generally needs to be oversized to accommodate the largest wheels used. Accordingly, if the device is used for any pipe other than the largest pipe diameter and the largest wheels are not necessary, then motor will be oversized for the application. Thus, for inspecting all but the largest pipes, the motor in conventional crawlers most is oversized.

Larger motors require more power. More power requires a larger cable. And the cable is the heaviest load the motor must accommodate. Therefore, there is an upward spiraling energy requirement—i.e., bigger motors require bigger cables, and bigger cables require bigger motors.

Applicant has identified the need to avoid oversizing the motor in pipe crawlers to accommodate wheels of different diameter. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention eliminates the need to oversize the motor in a pipe crawler to accommodate wheels of different diameter. Specifically, the present invention involves a crawler configuration that accommodates different pipe sizes through the use of actuatable legs which extend the wheels in various degrees of extended positions for different pipe diameters, while the wheel size remains the same. Specifically, rather than having wheels connected to a central motor in the crawler body as in a conventional crawler, the crawler of the present invention uses independent hub motors, allowing the wheels to be discrete from the crawler body. Thus, the crawler uses the same hub motors regardless of pipe diameter size, and accommodates different pipe sizes using actuatable legs. Accordingly, the motors on the crawler are sized optimally for a single wheel size. This reduces the motor energy requirements of the crawler. Because the motor energy requirements are decreased, a smaller cable is be used, and because a smaller cable is being used, the motors can be smaller. And so on. Thus, the present invention reverses the upward spiraling energy requirements described above.

Additionally, in one embodiment, the present invention includes a battery in the body of the crawler to provide a motor energy buffer. Thus, when additional motor power is necessary to get over debris or similar obstacle, the extra power for the motors is provided by the battery and not by the cable. However, when not moving or in a low-power consumption condition, the power supplied by the cable can recharge the battery. Thus, use of the battery tends to moderate/buffer power requirements of the cable, thereby further reducing the required cable size, and, thus, in turn, reducing the motor size, which compounds the energy savings. Furthermore, the use of LEDs and other efficient light sources can further reduce the energy requirements.

Accordingly, in one embodiment, the crawler comprises: (a) a body; (b) a camera head in or connected to said body; (c) a plurality of motorized hub assemblies; and (d) a plurality of legs, each of said plurality of legs having a first end and a distal second end, said first end being connected to said body, and said second end being connected to one of said plurality of motorized hub assemblies, wherein said legs are actuatable to define a minimum extended position and an extended position, wherein said motorized hub assemblies are close to said body in said minimum extended position, and distal from said body in said extended position.

DETAILED DESCRIPTION

Figure 1:
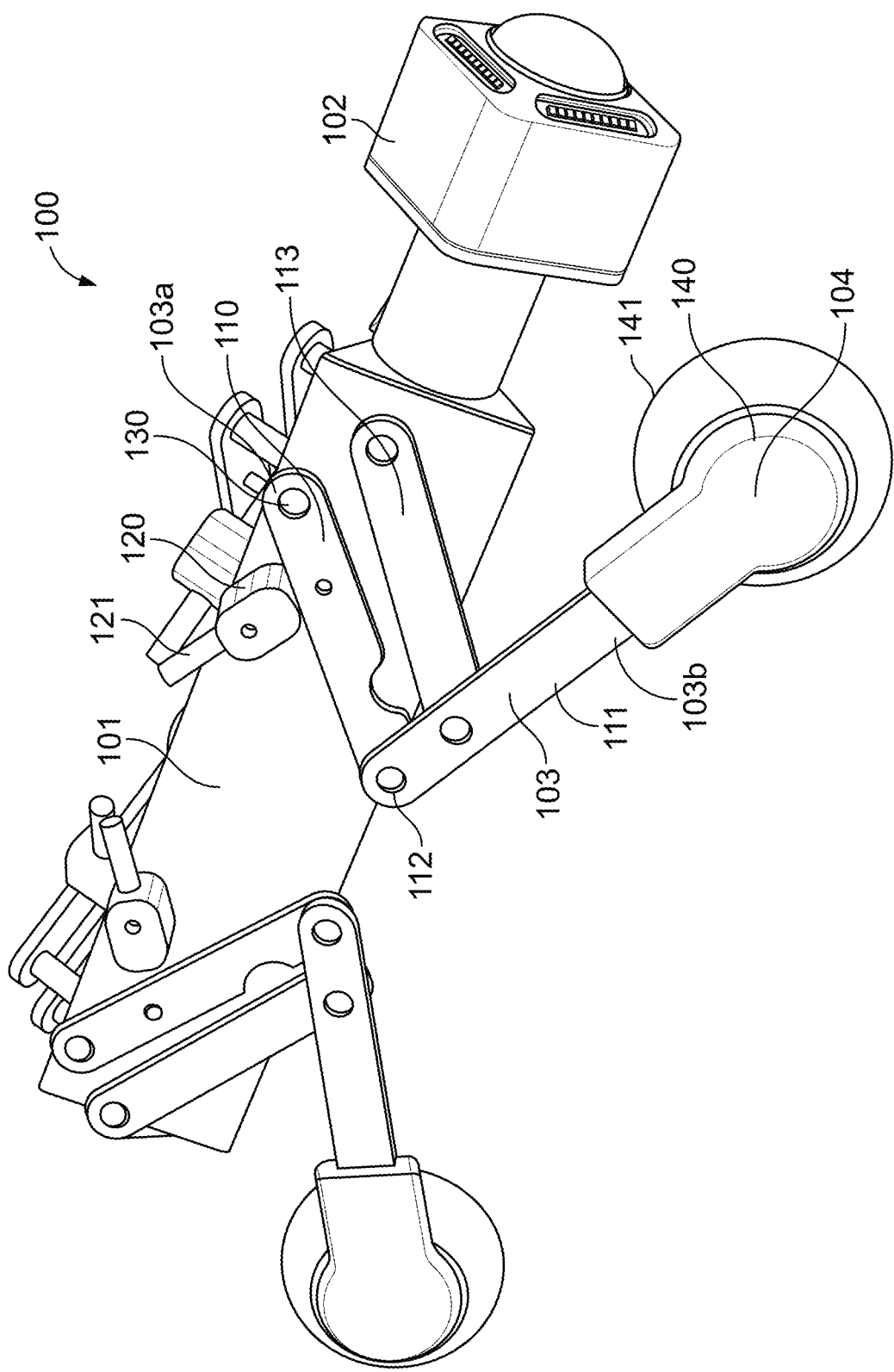
FIG. 1 shows one embodiment of the crawler of the present invention with its legs extended in an intermediate extended position.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Referring to FIG. 1A, one embodiment of the crawler 100 of the present invention is disclosed. As mentioned above, the crawler 100 is configured for inspecting pipes of varying diameter and comprises (a) a body 101; (b) a camera head 102 in or connected to said body; (c) a plurality of motorized hub assemblies 104; and (d) a plurality of legs 103, each of said plurality of legs having a first end 103a and a distal second end 103b, said first end being connected to said body, and said second end being connected to one of said plurality of motorized hub assemblies. These elements are described below in greater detail and in connection with selected turn of embodiments.

In one embodiment, the legs are actuatable to define two or more positions between a minimum extended position and a maximum extended position, wherein said motorized hub assemblies are close to said body in said minimum extended position, and distal from said body in said maximum extended position. This embodiment allows the same crawler to be configured for different size pipes. For example, referring to FIGS. 2A-D, the legs are in a minimum extended position such that the hub assemblies 104 are close to the body. Conversely, referring to FIGS. 3A-C, the legs are in an maximum extended, thereby positioning the hub assemblies away from the body. In one embodiment, there are intermediate extended positions between the minimum extended and extended positions, as shown in FIG. 1B.

An important feature of the claimed invention is that the crawler comprises motorized hub assemblies rather than just wheels. The hub assembly 102 comprises a motorized hub 140 which turns a wheel 141. By having motorized hub assemblies, the driving force for the wheels is no longer located in the body of the crawler, and, thus, the wheels may be discrete from the crawler body and thus are free to extend as far away from the body of the crawler as need be. In one embodiment, the motorized hub comprises a gear reduction between the motor and the rotating hub. Those of skill in the art in light of this disclosure will understand suitable gear reduction configurations, including, for example, planetary gear reduction. The motorized hub assemblies are available commercially from, for example, Maxom (Switzerland)

In one embodiment, the legs extend from the body at an angle to accommodate different size pipes. More specifically, having the legs extended at angle from the body of the crawler allows the crawler to be centered in different size pipes depending upon the extension of the legs. Having the legs extended an angle from the body also adds stability to the crawler. The degree of the angle at which the legs extend from the body can vary. For example, referring to FIG. 3C, the legs extend from the body at an angle α. The angle α can vary according to application. For example, in one embodiment, angle α is between 30 and 120°, and, in a more particular embodiment, angle α is between 35 and 90°, and, in a more particular embodiment, angle α is between 40 and 70°, and, in even more specific embodiment, angle α is about 45 and 60°. In one embodiment, the angle between the legs is the same for both the forward and the rear legs. In another embodiment, the angles vary. Those of skill in the art in light of this disclosure can determine which configuration is optimal for the application.

Therefore, the combination of the actuating legs, angle legs, and motorized hub assemblies provides a single crawler configurable for different sized pipes. Referring to FIGS. 2A-D and 3A-C, various configurations of the crawler 100 are shown with the legs extended to various positions for different size pipes. For example, referring to FIGS. 2A-D, the crawler 100 is shown in a relatively small pipe 201 (e.g. 150 mm) with its legs in the minimum extended position. In FIGS. 3A-C, the crawler 100 is shown with its legs in the maximum extended to accommodate a relatively large pipe 301. Therefore, by varying the extension of the legs and/or moving the camera head as described above, a single crawler may be configured in different ways for different size pipes.

The legs and their actuation mechanism may be configured in different ways. For example, in one simple embodiment, each leg comprises just one component with the first end attached to the body and the second end attached to the hub. In other words, the legs are not articulated.

Alternatively, rather than each leg being just one component, the leg may be articulated and comprise two or more components. For example, referring to FIG. 1, each of the legs 103 comprises a first member 110 and a second member 111 connected to each other by a joint 112. In one embodiment, the first member comprises the first end 103a and is connected to the body 101 at connection point 130, and the second member comprises the second end and is connected to the motorized hub. The joint 112 may be configured in different ways, for example, it may be a pivot, hinge, or a motorized joint (discussed below). Likewise, connection point 130 may be configured in different ways, including, for example, a pivot point or a connection to a rotating shaft (discussed below).

In the embodiment of FIG. 1, connection point 130 a pivot connection to body 101. In one embodiment, as shown in FIG. 1, the leg also comprises a lever 113 connected between the body 101 and the second member 111 to support the second member and to cause the second member to rotate with respect to the first member as the first member rotates with respect to the body.

As mentioned above, the actuation mechanisms for extending the legs can vary. For example, in a simple embodiment, the legs are manually actuated. In such an embodiment, the user may manually manipulate the legs to adjust the extended position of the motorized tubs using sets screws/nut bolts/or other fasteners. Alternatively, a ratcheting mechanism may be used allowing the user to extend each leg while the ratchet mechanism prevents its return until the user actuates a lever to release the pawl from the gear.

In another embodiment, the actuation mechanism is automated. For example, in the embodiment of FIG. 1, the actuation mechanism comprises one or more linear motors for linearly moving a push rod 121 which is connected to the first member 110. As the push rod pushes the first member 110, the first member 110 pivots about its connection to the body 101 to either extend or retract the motorized hub assembly 104. More specifically, as the push rod 121 rotates the first member about the connection point 130, lever 113 will cause the second member 111 to either move toward or away from the body 101 based on the direction of rotation of the first member 110. For example, if the push rod 121 of the front right leg is actuated forward, then the first member 110 will rotate counterclockwise around the connection point 130, causing the joint 112 to move forward, and thereby causing the distal end 103b of second member 111 to move away from the body, thereby extending the motorized hub assembly 104 away from the body.

In the embodiment of FIG. 1, the actuation mechanism comprises linear motors and pushrods to actuate the legs. However, other embodiments are possible. For example, rather than a linear motor, a spindle motor and spindle may be used to rotate the first member 110 around the connection point 130.

In yet another embodiment of the actuation mechanism, the connection point 130 of each leg is connected to a shaft which is turned by a motor. In one embodiment, independent motors turn each shaft. Alternatively, the shafts at each connection point of each leg are interconnected and turned by a single motor. For example, the various shafts may be interconnected through a common worm gear to which a single motor is connected. As a worm gear is rotated by the motor, the shafts rotate, and the first members rotate in kind to effect the actuation of the legs as described above. In one embodiment, the motor(s) are exterior to the body 101. In another embodiment, the motor(s) are interior to the body.

In yet another embodiment of the actuation mechanism, the joint 112 is motorized. For example, referring to FIG. 4, one embodiment a leg 400 is shown in which a motor 401 is disposed at the joint 112. As the motor rotate, it causes the angle between the first member 110 and the second member 111 to change. As this angle increases, the hub assembly 104 moves distally. For example, in FIGS. 4A-C, the motor 401 causes the hub assembly 104 to move from a minimal extended position corresponding to 150 mm pipe in FIG. 4A to a maximum extended position corresponding to a 400 mm pipe in FIG. 4C. Along the way, the hub assembly moves through intermediate extended positions corresponding to 200 and 300 mm pipes in FIG. B. (It should be understood that, although 150, 200, 300, and 400 mm pipes are considered herein, it should be understood the invention is not limited to these pipe sizes, and the device of the present invention may be configured for any pipe size depending upon the application.)

Figure 4A:
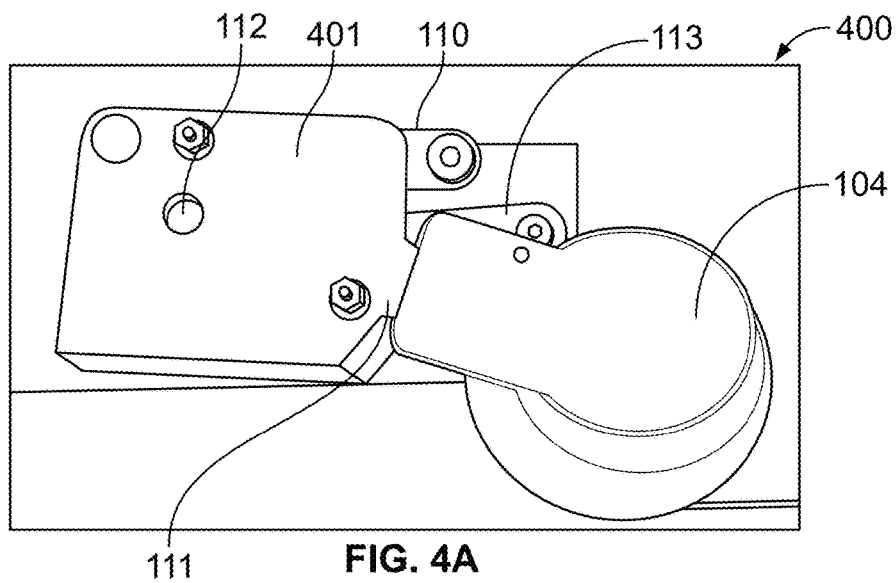
FIGS. 4A-C show one embodiment of the leg assembly extended to different degrees.
Figure 4B:
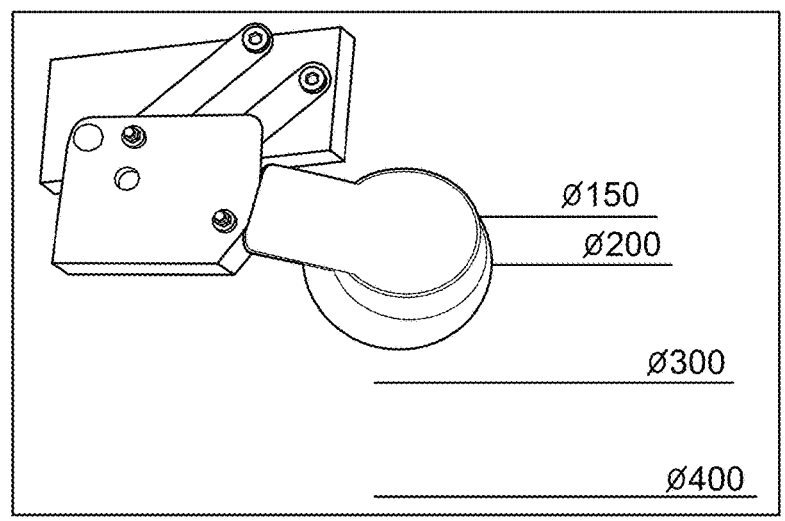
Figure 4C:
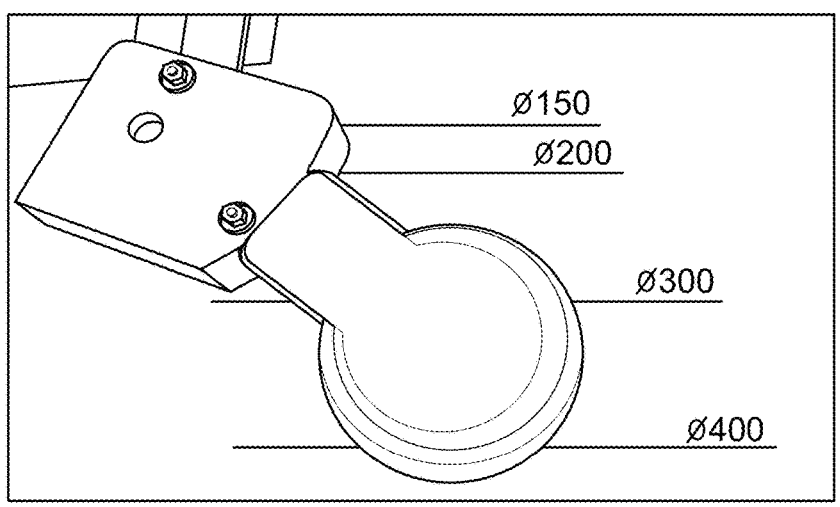

Disposing the motors at the joint 112 may be preferred from the standpoint of lowering the center of gravity of the device and keeping the body 101 slim as soon as possible. In the embodiment of FIG. 4A-C, the motor is disposed external to the first and second members as shown. However, it should be understood that, in an alternative embodiment, the leg component(s) may be thicker to accommodate the motor being internal to the leg component(s).

Alternatively, rather than have the motor in or on the legs, one or more motors may be interior to the body, and a series of gears may be used from first end on the leg to the joint to actuate the different members. Still other embodiments will be obvious to those of skill in the art.

Although the actuator mechanism embodiments considered so far involve rotating leg component(s) to extend and retract the hub assembly 102, other embodiments exist. For example, rather than rotating/pivoting leg component(s), the legs may comprise telescoping components in which a motor telescopically extend/retracts the components relative to each other.

Although the number of legs can vary, in the embodiment shown in FIG. 1, the plurality of articulated legs comprises two forward legs and two rearward legs. It should be understood, however, that other embodiments are possible. For example, in one embodiment, just three legs are used, for example, one central leg in the rear end to legs forward. Such an embodiment may have certain advantages as it functions as a tripod which may improve stability under certain circumstances.

Furthermore, it should be appreciated that the various embodiments disclosed herein for the legs and actuation mechanisms may be mixed and matched within a given device such that any combination of legs and actuation mechanisms disclosed herein within a given device as possible. For example, in one embodiment, the rear leg(s) may be manually actuated in the front legs may be automatically actuated. Still other combinations will be obvious to those of skill in the art in light of this disclosure.

The camera head 102 may comprise any known imaging device used in industrial/commercial applications. Such imaging devices are well known and will not be described herein in detail. In one embodiment, the camera head comprises an imaging device 141 and one or more lamps 140. In one embodiment, the lamps are LEDs, which tend to be more energy-efficient.

In one embodiment, the camera head is integrated with the crawler body. For example, it may be integrally formed or rigidly attached to the crawler body. In another embodiment, the camera head is discrete from the body. In one embodiment, the head is configured to move relative to the crawler body. For example, in one embodiment, the camera is configured to move in a vertical direction relative to the body to accommodate pipes of different sizes. Those of skill in light of this disclosure will understand different ways in which the head camera head may be configured to move relative to the crawler body. For example, in one embodiment, a solenoid switch is used to move the head from one position to the other. Still other embodiments will be understood by those of skill in the art.

As mentioned above, it is important that the camera be centered within the pipe. In one embodiment, the legs are actuated by a user using a remote control. Alternatively, the device 100 may comprise a controller to evaluate the position of the camera head within the pipe and automatically actuate the legs to position the camera head in the center of the pipe. Such an automatic centering function may be preferred in the event that the pipe contains debris which may affect the pipe's effective diameter.

Aside from imaging, the crawler may comprise other sensing equipment. For example, in one embodiment, the crawler comprises an inclination sensor such that the operator knows when the crawler is going up or down a gradient in a pipe. The crawler may also comprise an internal pressure sensor to ensure that internal pressure exceeds the external pressure to ensure that no outside contaminants/water can enter the crawler body/camera head. The sensor may also comprise position detectors to determine the effective center of the pipe. (The effective center of the pipe may be different than the actual center if there is debris in the pipe.) Such a sensor may be particularly important in an embodiment in which a controller automatically actuates the legs to center the camera within the pipe as discussed above.

Figure 2A:
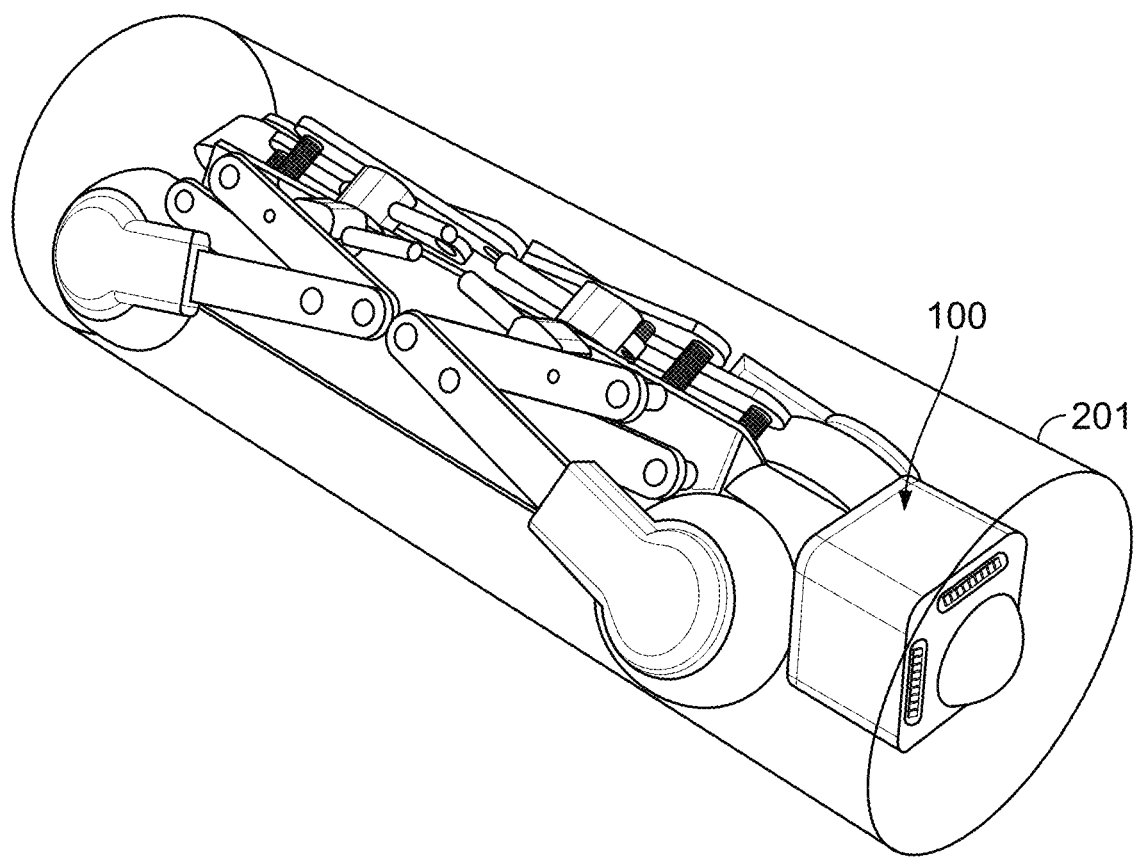
FIG. 2A shows a perspective view of the crawler of FIG. 1 in a relatively small pipe with its legs in the minimum extended position.
Figure 2B:
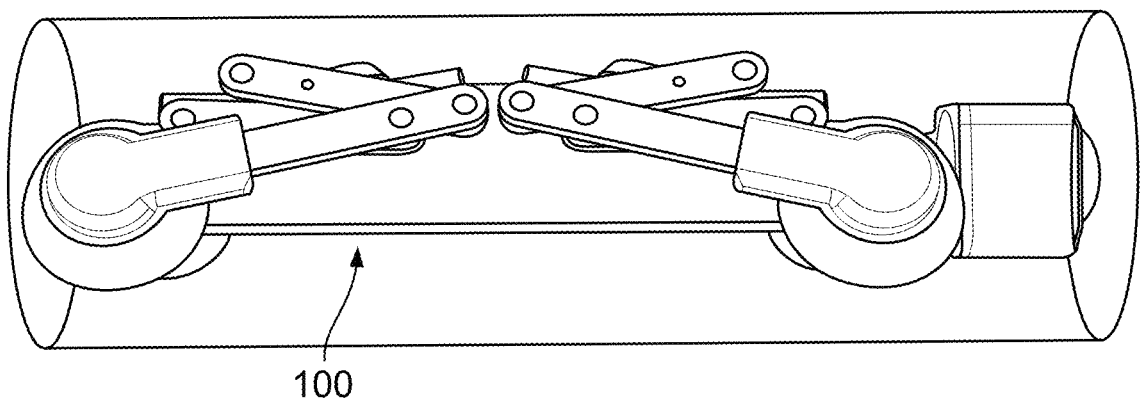
FIG. 2B shows a side view of the crawler of FIG. 2A.
Figure 2C:
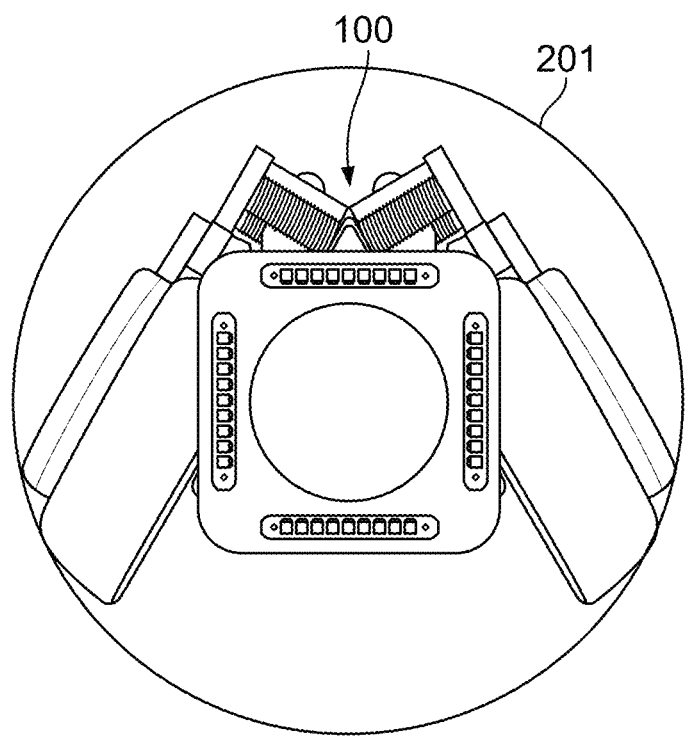
FIG. 2C shows a front view of the crawler of FIG. 2A.
Figure 2D:
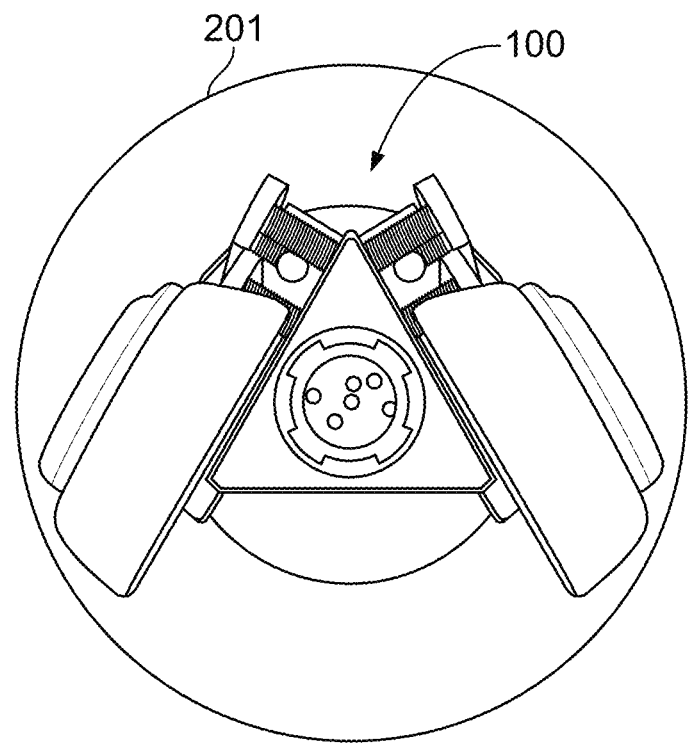
FIG. 2D shows a back view of the crawler of FIG. 2A.
Figure 3A:
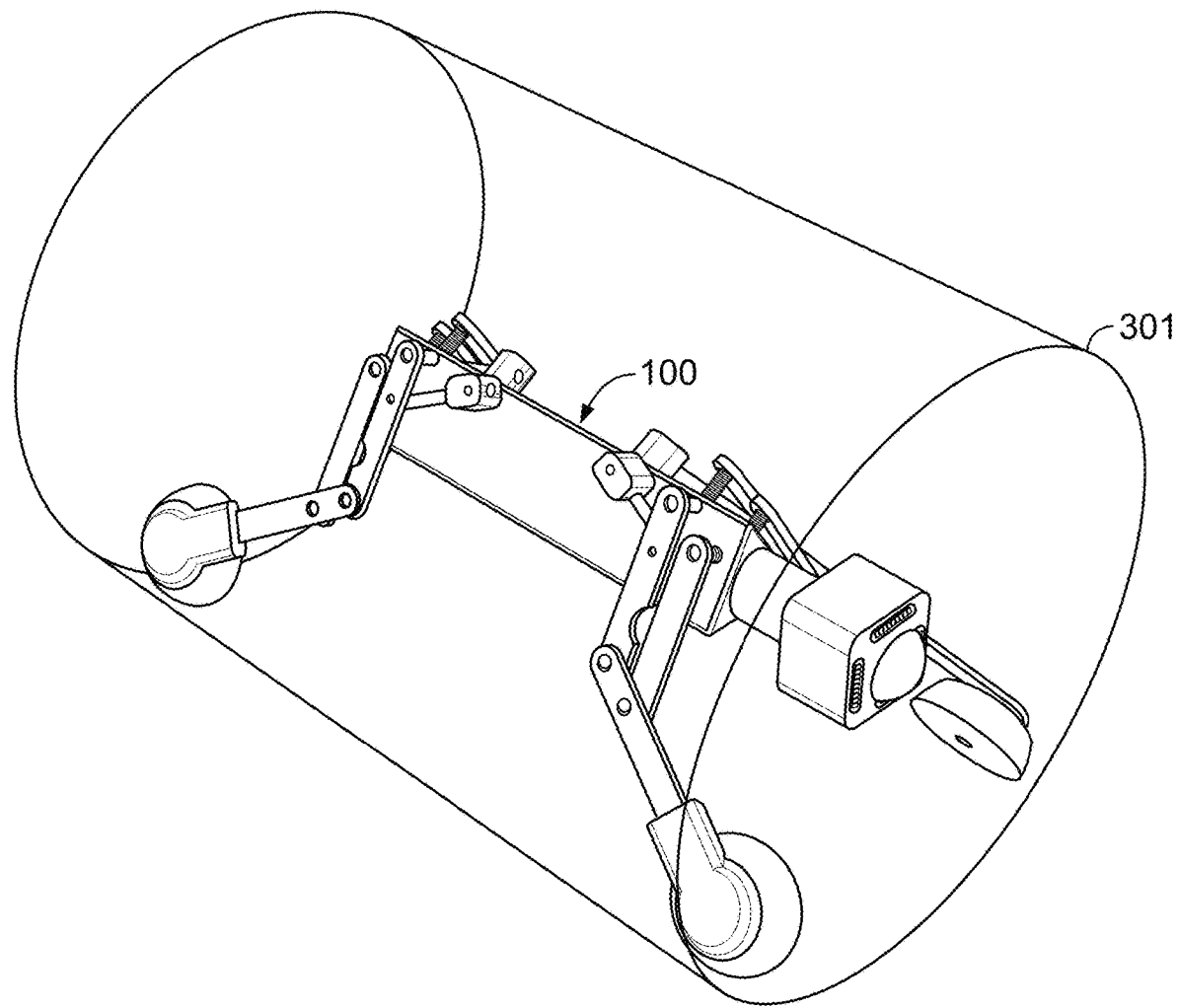
FIG. 3A shows a perspective view of the crawler of FIG. 1 in a relatively large pipe with its legs in the maximum extended position.
Figure 3B:
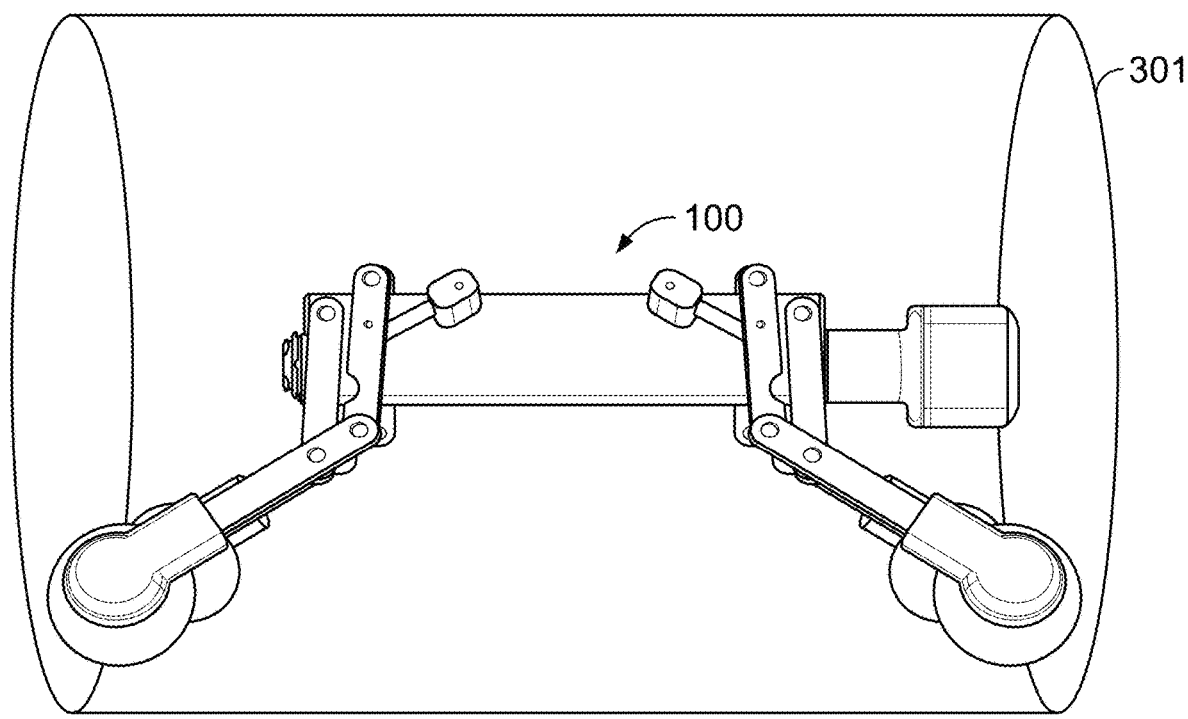
FIG. 3B shows a side view of the crawler of FIG. 3A.
Figure 3C:
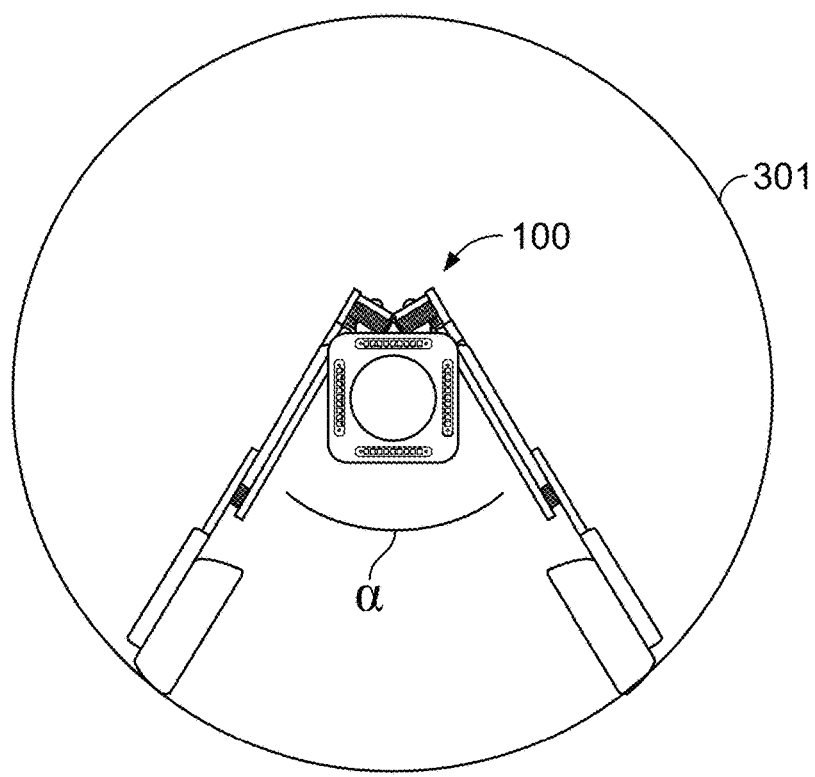
FIG. 3C shows a front view of the crawler of FIG. 3A.

In one embodiment, the body 101 has a triangular cross-section (see for example FIG. 2d). Such a cross-section facilitates the mounting of legs at an angled to one another as discussed above. In other words, the upper two opposing sides of the triangle may be at an angle such that the legs extending therefrom have an angle α as described above.

In one embodiment, the crawler further comprises a battery buffer to further reduce the power requirements of the crawler. More specifically, the battery buffer may be used to provide power to the motor during peak loads, for example, when the crawler is traveling up an inclined pipe or crawling over debris. In such instances, the battery buffer can provide additional power to the motor rather than having to size the power cable to supply this intermittent peak power for just occasional peak loads. In other words, rather than sizing the cable to accommodate the peak power requirements of the motor, the battery buffer can be used to provide this transient peak power and thus allow the power cable to be sized instead for normal power requirements. As mentioned above, by reducing the requirements of the power cable, the load the crawler needs to move is reduced, therefore allowing the crawler to have a smaller motor and in turn consume less power as described above.

In one embodiment, in addition to the battery, the crawler also comprises a battery charger to charge the battery during low power consumption such as when the crawler is stationary or when it is going down a declining pipe. By providing a battery charger, the size of the battery can be minimized, thus reducing weight, which in turn minimizes the load on the crawler and the motor size/energy requirements.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. A device for inspecting pipes of varying diameter, said device comprising:
    a body;
    a camera head in or connected to said body;
    a plurality of motorized hub assemblies; and
    a plurality of legs, each of said plurality of legs having a first end and a distal second end, said first end being connected to said body, and said second end being connected to one of said plurality of motorized hub assemblies;
    wherein said legs are actuatable to define a minimum extended position and an extended position, wherein said motorized hub assemblies are a first distance from close to said body in said minimum extended position and a second distance from said body in said extended position, wherein said second distance is greater than said first distance.

2. The device of claim 1, wherein said legs are articulated legs, each leg comprising a plurality of members which are configured to move relative to each other.

3. The device of claim 2, wherein said articulated legs define intermediate positions between said minimum extended position and said extended position.

4. The device of claim 2, wherein each of said articulated legs comprises at least a first member and a second member connected to each other by a joint, wherein said first member comprises said first end and is connected to said body, and said second member comprises said second end and is connected to said motorized hub; wherein said first and second members move relative to each other when said legs are actuated between said minimum extended position and said extended position.

5. The device of claim 4, wherein said joint is a pivot or a hinge to facilitate relative movement between said first and second members.

6. The device of claim 1, wherein said plurality of legs comprises at least two forward legs or two rearward legs.

7. The device of claim 6, wherein at least one of said forward or said rearward legs extend from said body at an angle to one another.

8. The device of claim 7, wherein said angle is between 4° and 60°.

9. The device of claim 6, wherein both said forward and rearward legs extend from said body at an angle to one another.

10. The device of claim 1, further comprising a battery disposed in said body and electronics for providing extra power to the motorized hub assemblies on an as-needed basis.

11. The device of claim 10, further comprising a battery charger to charge said battery during low-power consumption operation.

12. The device of claim 1, wherein said motorized hub assemblies have gear reduction to increase the torque of said motorized hub assemblies.

13. The device of claim 1, wherein said camera head comprises an imaging device and one or more lamps.

14. The device of claim 1, wherein said camera head his actuatable between an upward and a downward position.

15. The device of claim 1, further comprising an inclination sensor.

16. The device of claim 1, further comprising an actuation mechanism to actuate said legs.

17. The device of claim 16, wherein said actuation mechanism is automated.

18. The device of claim 16, wherein said actuation mechanism is at least one motor actuator.

19. The device of claim 1, wherein, when said device is on a surface, said body is at a minimum distance from said surface when said legs are in said minimum extended position and at an extended distance from said surface when said legs are in said extended position, wherein said minimum distance is less than said extended distance.

20. The device of claim 19, wherein said body has an orientation with respect to said surface when said legs are in said minimum extended position, wherein said body has essentially the same orientation when said legs are in said extended position.

* * * * *